May 24, 1955
H. P. MANSBERG
2,709,050
TAKE-UP FILM CASSETTE
Filed Aug. 24, 1951
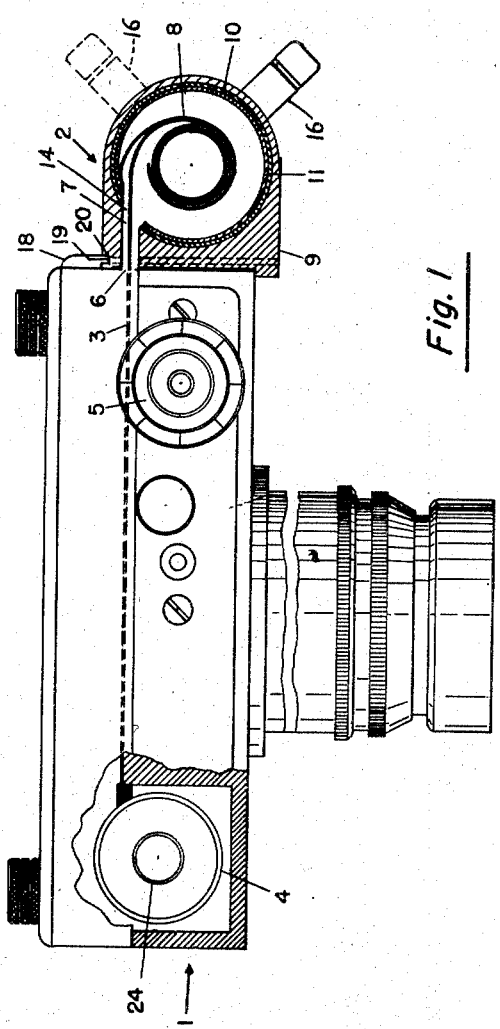
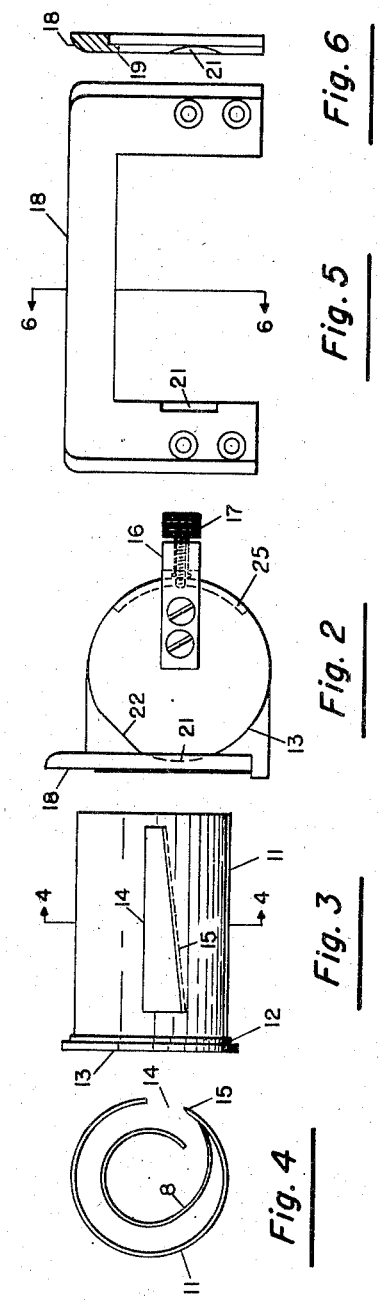
INVENTOR.
HYMAN P. MANSBERG
BY
Darby & Darby
ATTORNEYS

United States Patent Office 2,709,050
Patented May 24, 1955

2,709,050

TAKE-UP FILM CASSETTE

Hyman P. Mansberg, Fairlawn, N. J., assignor to Allen B. Du Mont Laboratories, Inc., Clifton, N. J., a corporation of Delaware Application August 24, 1951, Serial No. 243,421

2 Claims. (Cl. 242—71)

This invention relates to photographic cassettes and particularly to an improved roll film cassette especially adapted for detachable connection to photographic devices such as cameras to receive and detach exposed portions of the film for processing while permitting unexposed portions of the film to remain in the photographic device.

At the present time it is common practice to supply unexposed film for many of the current photographic devices in light-tight cassettes which are insertable into the device. With the insertion of the cassette in a photographic device film is then drawn from this cassette parallel with the focal plane and wound onto a take-up spool. When the entire supply of film in the cassette is exposed, the operator must wind the film back into this cassette before opening the camera to remove the film and cassette for processing.

The present invention provides a take-up cassette which may be used to store the exposed film so that it may be removed from the camera and processed without the necessity of rewinding the film or opening the camera and without exposing any part of the film to light.

It is an object of this invention to provide an improved detachable light-tight film storage cassette for photographic devices.

It is a further object of this invention to provide a detachable photographic cassette having means for severing or cutting the exposed portion of film stored in the cassette from the unexposed portion in the photographic device to permit removal of the exposed portion for processing.

These and other objects, features and advantages of the invention will become more apparent to those skilled in the art when considered in connection with the following description and the drawing in which:

Fig. 1 is a side elevation view, with parts in cross-section illustrating a commonly used photographic device with the cassette of the present invention attached thereto.

Fig. 2 is a side elevation view of the cassette and a portion of the mounting plate or frame which is attached to the photographic device, illustrating the locking cam and the locking screw for attaching the cassette to the photographic device.

Fig. 3 is a plan view of the inner rotatable cylinder of the cassette.

Fig. 4 is a view taken along the line 4—4 of Figure 3.

Fig. 5 is a plan view of the mounting plate or frame which is fastened to the end of the device for attaching the cassette thereto, and Fig. 6 is a view taken along the line 6—6 of Fig. 5

Referring now to the drawing and particularly to Fig. 1 there is illustrated a common type of roll film photographic device 1 provided with means for securing the detachable cassette 2 of the present invention to one side of the device, as shown. The cassette 2 receives the exposed portion of a film 3, which is drawn from the standard cassette 4 by means of film advance knob 5 in a manner which is well known to those skilled in the art. The exposed film passes through a slot or opening 6 in the side wall of the photographic device, the opening being in alignment with a corresponding slot or opening 7 in the take-up cassette housing when the latter is affixed to the photographic device. Both the slot 6 in the photographic device body and the slot 7 in the cassette are lined with felt to prevent entrance of light. As the film reaches the inside of the cassette, it is caused to roll up on itself by the restraining action of an inner spiral spring member 8.

The detachable cassette 2 comprises an aluminum housing 9, containing a steel bushing or liner 10 press-fitted to the inner walls of the housing and an inner steel cylinder 11. The steel cylinder is mounted for rotation in the liner and is closed at one end to provide a light-tight chamber within the housing. To insure against the admission of light to the housing chamber the closed end of the cylinder is provided with an annular stepped portion 12, the periphery of which slidably engages the inner wall of the housing 9 and the end of which engages the exposed end of the liner 10. A flange 13 projecting outwardly from the stepped portion 12 is provided for locking the cylinder 11 in the housing in a manner that will be described hereinafter. To effect a severing of the exposed portion of the film from the unexposed portion, the cylinder 11 is provided with a longitudinal slot 14 one edge 15 of which is angularly displaced from the opposite edge of the slot and sharpened to form a cutting edge. The spiral spring member 8 is welded to the inner surface of the cylinder adjacent the slot to guide the incoming film along a spiral path so that the film will curl on itself as it is received in the cylinder. (See Figs. 1 and 4.)

On the closed end of the cylinder there is fastened a locking lever 16 on which a locking thumbscrew 17 is mounted. The shank of this thumbscrew projects into a peripheral groove 25 milled into the cassette housing through an angular displacement of approximately 90 degrees, so that the inner steel cylinder may be rotated within the limits of this peripheral groove.

To mount the cassette 2 on the photographic device, a generally U-shaped frame or plate 18 (Fig. 5) is fastened to the end of the device to slidably receive the cassette. Each of the three sides of this plate is provided with inwardly extending flanges 19 which cooperate with corresponding slots 20 milled into the cassette housing to permit the sliding of the cassette into place at the end of the device with the slots 6 and 7 of the respective device and cassette in alignment. With the cassette in position on the photographic device it is secured by the provision of a slot 21 in the frame which receives and cooperates with flange 13 of the cylinder 11. To permit the insertion of the cassette into the frame 18 a portion 22 of the flange 13 is removed as shown in Fig. 2. With the portion 22 of the flange 13 removed, the cylinder 10 may be rotated until the flat portion 22 is in a position to clear the frame.

The cassette is then inserted into the frame and the locking lever 16 is rotated to the downward position (shown in full lines in Fig. 1). In this position the cassette is locked to the frame by the entrance of flange 13 into the slot 21 of plate 18 and at the same time the slot 14 is caused to be in alignment with slots 6 and 7 of the photographic device and the cassette casing respectively. That portion of the cassette housing which fits against the camera is provided with felt to make it light-tight.

In operation, the cassette, with the locking lever in the closed position, is inserted into the flanges of the mounting plate 18 and pushed into place. At this point the slot 7 in the cassette is directly opposite the slot 6 in the camera wall. The locking lever is then turned to the open or downward position, shown by full lines in Fig. 1. This rotates the inner cylinder 11 so that the slot 14 is directly opposite the slot 7 in the cassette housing and also locks the cassette to the camera by the action of the flange 13 engaging the slot 21. The locking screw 17 is then turned and locks the inner cylinder.

Exposures of the film are made by the operator, and as the film is advanced by knob 5, it passes through the aligned slots into the cassette where it forms a roll in the center of the spring member 8. After the required number of exposures are made, and after advancing the film sufficiently to insure that the exposed portion is all contained within the cassette, the locking screw 17 is loosened and the locking lever is moved upwardly to the closed position. This simultaneously causes the film to be sheared by the action of the knife edge 15 pressing the film against the edge of the steel liner, and the inner cylinder rotates so as to close the slot, thus preventing entrance of light. The small portion of the film remaining in the slot 7 of the cassette between the wall of the device and the now closed cylinder 11 is retracted into the device 1 by the rewind knob 24, the locking screw 17 is tightened and the cassette removed from the camera, to be processed when convenient.

With a device such as I have described hereinabove, exposed portions of film may be immediately removed from the photographic device for processing without consideration for the unexposed portions remaining in the photographic device.

What I claim as new and desire to secure by Letters Patent of the United States is:

1. A cassette for detachable mounting on a photographic device to receive photographic film therefrom, said cassette comprising a casing having an opening in the wall providing communication between the interior and exterior thereof, a liner extending into said casing, said liner having an opening in alignment with the opening in said casing, and a cylindrical member having a slot in the wall thereof and a closed end, said member being mounted in said casing for rotation to one position with the said slot and openings in alignment and to a second position in which said members covers said openings to provide a light-tight compartment therein, said cylindrical member having a locking lever fastened on said closed end thereof, said lever having locking means bearing against said casing which when in locking position prevents rotation of said cylindrcal member 2. In combination, a photographic camera and the like having a film-passing slot in the end thereof, said slot being co-planar with the focal plane of said camera a mounting plate having a locking slot milled therein secured to the slotted end of said device, a casing having a film-passing slot therein and a peripheral groove, said casing being detachably mounted on said camera with said film-passing slots in alignment, a rotatable cylinder within said casing having an opening therein, one edge thereof being a cutting edge, said rotatable cylinder having a flange at one end, means for rotating said cylinder so that said opening and film-passing slots are in alignment thereby permitting exposed film to be passed along said focal plane of said device into said rotatable cylinder, said rotatable cylinder also serving to sever said exposed film and simultaneously to close said film-passing slot in said casing against the entrance of light, said flange having a flat portion which cooperates with said mounting plate to permit attachment of said casing, said means for rotating also serving to rotate said flange into said locking slot in said mounting plate thereby locking said casing to said mounting plate, said means for rotating comprising a lever attached to said flange, said lever being equipped with a locking screw to lock said rotatable cylinder against accidental rotation, the end of said locking screw being positioned in said peripheral groove to retain said cylinder in said casing.

References Cited in the file of this patent
UNITED STATES PATENTS

| | | |
|---|---|---|
| 1,313,454 | Beidler | Aug. 19, 1919 |
| 1,764,450 | Hindle | June 17, 1930 |
| 2,095,849 | Wittel | Oct. 12, 1937 |
| 2,236,917 | Pollock | Apr. 1, 1941 |